US005339613A

United States Patent [19]

Wymore

[11] Patent Number: 5,339,613

[45] Date of Patent: Aug. 23, 1994

[54] LEAF LOADING SYSTEMS FOR TRUCK MOUNTED COMPACTORS

[76] Inventor: Roger S. Wymore, 4612 F Ave. NE., Cedar Rapids, Iowa 52402

[21] Appl. No.: 39,586

[22] Filed: Mar. 29, 1993

[51] Int. Cl.$^5$ ..................... A01D 85/00

[52] U.S. Cl. ..................... 56/344

[58] Field of Search ..................... 56/344, 345, 364

[56] References Cited

U.S. PATENT DOCUMENTS 4,324,091 4/1982 Wistuba et al. .................. 56/344 X 4,888,940 12/1989 Deutsch .................. 56/344 X 4,996,831 3/1991 Pearson et al. .................. 56/344 X

*Primary Examiner*—Thuy M. Bui

[57] ABSTRACT

A truck fitted with a rear loading compactor in combination with a system of equipment facilitates the picking up of leaves from City streets. Compaction of the leaves allows more carrying capacity and fewer trips to the dump thus improving efficiency. The leaves are raked into the gutters by property owners. A two-man operation, the truck driver operates a sweep mechanism from the cab of the truck. The driver lowers the sweep and as he drives forward the leaves are windrowed allowing the truck's wheels to straddle the row. As the truck moves the row emerges from under the rear of the compactor and is loaded by one of three different types of loaders; a belt loader, a drum loader or a scoop loader. Each type has its own particular attributes. The second operator rides a side platform and raises and lowers the loader from operating position to running position. The running position is used when hunting new leaf piles or taking a load to the City's compost. A front bumper supported detector warns of unwanted debris in the leaf row. No additional equipments are required during the leaf havesting.

13 Claims, 6 Drawing Sheets

LEAF LOADING SYSTEMS FOR TRUCK MOUNTED COMPACTORS

BACKGROUND—FIELD OF INVENTION

This invention describes a system of equipment attached to the front and rear of a truck with integrated hydraulic compactor for the purpose of collecting disiduous leaves from street surfaces and hauling compacted loads to a community maintained compost.

BACKGROUND—DESCRIPTION OF PRIOR ART

Recent laws have been enacted in Iowa and elsewhere which place restrictions on how municipalities may dispose of leaves. Landfills are filling at rates which have alarmed officials. Burning the leaves, a method practiced in smaller communities, is now prohibited. Only official composts are allowed as disposal sites. Prior to these laws being passed, leaves could be dumped into private lots for fill which meant the trucks had generally short distances to travel. Equipment sophistication was generally limited to existing street department equipment such as front end loaders and dumptrucks.

Vehicles currently in use for municipal pickup and containment of leaves for transport to composts are:

1. high powered vacuum machines blowing leaves into dump body trucks;
2. clamshell front-end loaders for loading leaves into dump body trucks;
3. front-end loading dump body trucks which can fill a scoop bucket and dump its contents into the truck body to the rear of the cab.

The vehicles listed above have two obvious disadvantages. They can not pick up leaves in a continuous manner and trucks which are designed to carry tons must be sent to the compost with under 500 pounds. A further disadvantage of an open box is that many of the leaves do not make it to the compost but instead spread along the route blown overboard during the trip. A third piece of equipment is sometimes used—a watering truck. The leaves are first wet down before placing them in the dump trucks.

The street department of the City of Cedar Rapids, Iowa, recently took command of two compactor trucks formerly owned and operated by the City's sanitation department. The biggest problem with this machine was how to get the leaves into the rear hoppers. Extensions were fabricated to extend the hopper dimensions so a large bite of leaves could be dropped into the hopper for compacting. A front-end loader travels with the compactor to load it. Although the carrying capacity of the compactor makes a vast improvement, loading is still slow and inefficient.

I have taken the same compactor truck and mounted an articulated sweep to the front end of the truck for the purpose of moving the leaves away from the gutter to the center of the truck. As the truck progresses, the leaves emerge from under the rear end of the truck perfectly centered for loading into the hopper. A heat shield is fastened to the underside to keep the dry leaves away from underside exhaust piping. A second piece of equipment is mounted to the hopper of the compactor for the purpose of loading the leaves into the hopper. I have invented three separate machines to do this job. The three are as follows:

1. a beltloader;
2. a drum loader; and,
3. a scoop loader.

The first two loaders are strictly leaf loading rakes and cannot tolerate extraneous waste such as tree limbs and large branches are sometimes found in the rakings. A trash detector is added to the front of the truck, raised and lowered with the sweep mechanism. Whenever it catches a foreign article of trash a certain amount of pressure builds up and it emits an audible alarm to the operators. They can then make a determination whether or not to pick up that particular pile of leaves or leave it to the disposal of the property owner.

The scooploader is capable of taking almost any trash along with the leaves. Therefore when a scooploader is used no detector need be mounted.

The drumloader and beltloader are continuous loading machines. With the scooploader, the truck must stop periodically allowing time to dump loads into the hopper. It will be seen that the stops take a minimal amount of time, but some will find this less desirable. It will be, however, much cheaper to purchase and operate as there are few moving parts and it makes use of the hydraulics inherent to most all compactors. The drumloader requires no hydraulic motor, using instead, a friction drive supplied from one of the support wheels. The beltloader is more compact and the rakes being driven independently of truck movement, may eat away exceptionally large leaf piles with little movement of the truck.

All of the above will be shown to pick up leaves without the need of a second vehicle. All have certain major advantages which certain street department buyers would choose over the others due to a particular method of operation. Therefore, it is necessary to include all three in this disclosure.

It will be shown that this combination will remove many of the disadvantages of the aforementioned implements and include some additional advantages and conveniences.

OBJECTS AND ADVANTAGES

Accordingly several objects and advantages of the combined leaf pickup and compactor truck are:

1. a 25 cubic yard compactor mounted on a truck can carry a minimum of 55 times the leaves of the average dump body;
2. once the leaves are in the compactor they are trapped and can never go anyplace but to the compost;
3. the endless belt rake and drumrake loaders allow for continuous motion of the truck while picking up the leaves at rates up to 4 mph;
4. the scoop and dump loader, although not a completely continuous loading machine, is able to load other yard residues such as tree branches which are sometimes mixed with the leaves.
5. no more than two men are required to operate any of the aforementioned leaf loading compactor trucks.

These advantages would allow 2 trucks operated by a driver and a compactor operator to do the work now being done by some 35 vehicles and at least 35 persons in Cedar Rapids, Iowa. A savings of nearly 250,000 dump truck miles and 2800 man-days per season for Cedar Rapids, a city of slightly over 100,000. Due to the increased efficiency, a private operator could service a large area including many small towns that would not be able to justify such an investment.

Further objects and advantages of my invention will become apparent from a consideration of the drawings and ensuing description.

DESCRIPTION OF INVENTION

THE SWEEP

Figure 3:
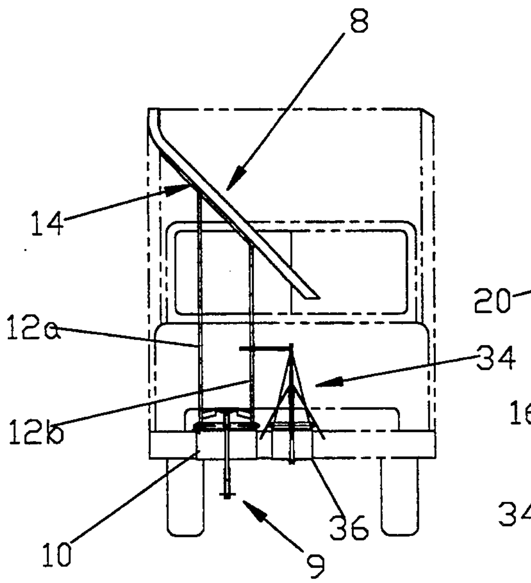
FIG. 3 is a front view of the compactor truck with sweep mechanism and trash detector in the travel position.
Figure 4:
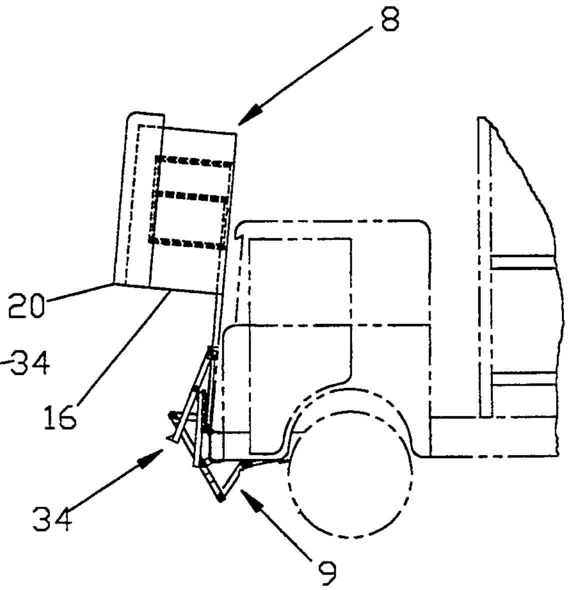
FIG. 4 is a partial side view of the front end of a compactor truck with sweep mechanism and trash detector in the travel position.
Figure 2:
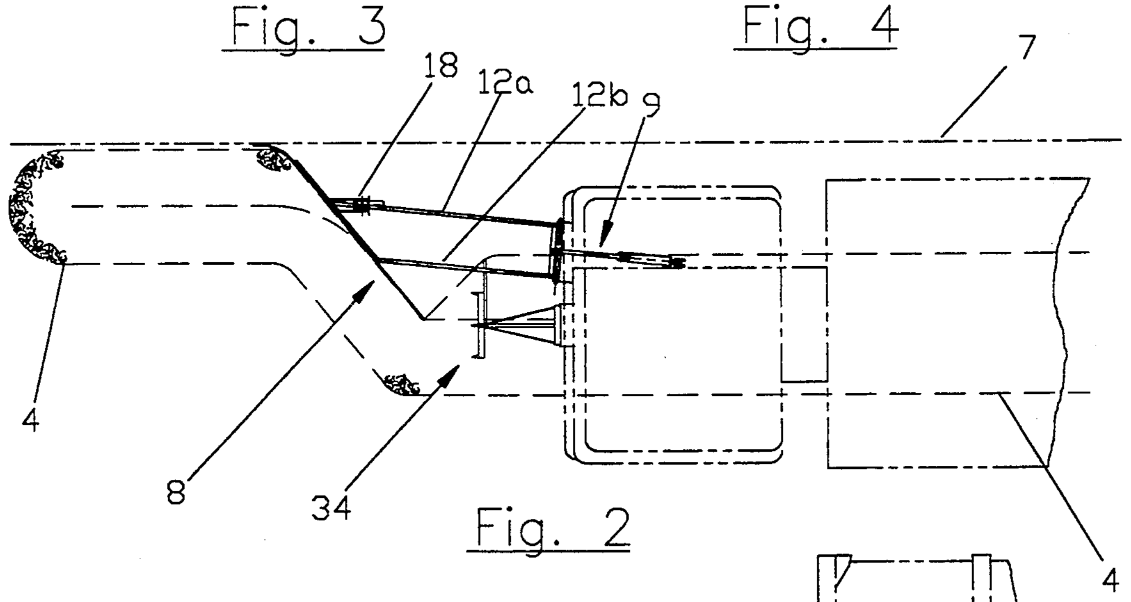
FIG. 2 is a top view of the compactor truck with sweep mechanism and trash detector in the sweep position.
Figure 1:
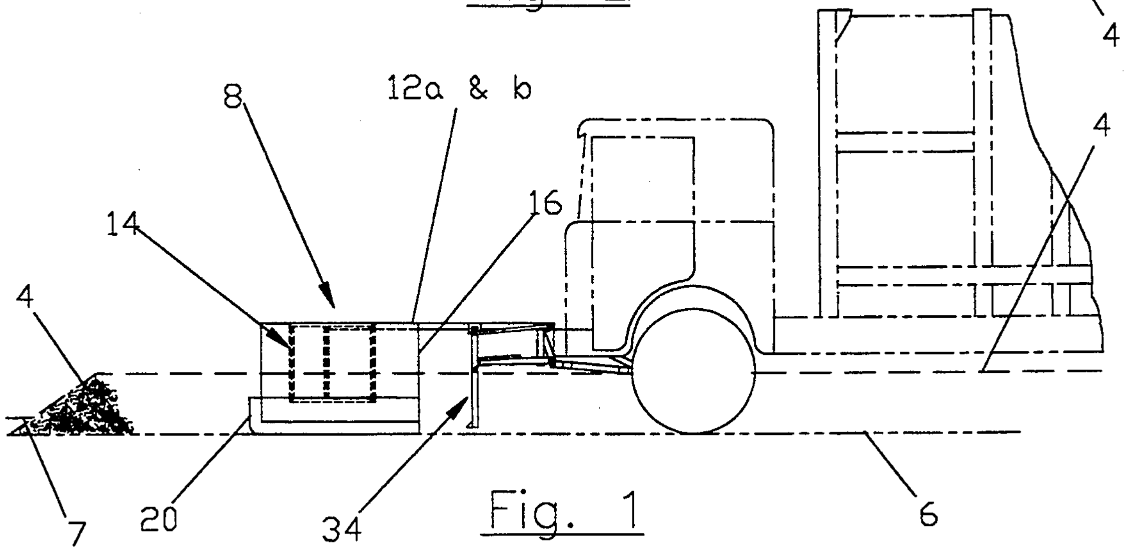
FIG. 1 is a side view of a compactor truck fitted with a sweep mechanism and trash detector in the sweep position.

FIGS. 1 thru 4 illustrate the sweep and detector mechanisms mounted on the front bumper of a truck supporting a rear loading hydraulic compactor. The sweep assembly 8 comprises a bumper clamp 10, to which is hinged a welded assembly with two arms 12*a* and 12*b* extending outward at an angle with the centerline of the truck to a backer frame 14. To this frame is fastened a sheetmetal sweeping shield 16 with the outer vertical edge rolled forward. A castered wheel 18 supports the shield at approximately 6 inches above the road surface. The plane of the shield makes an angle of 45 degrees with the truck centerplane. The scraper blade 20 is made of flexible plastic sheet material such as low density polyethylene. The curvature of the sweep shield forces the cubside end of the scraper blade into a nearly parallel direction with the curb. The scraper blade is slotted and the fasteners that retain it allow vertical slippage to compensate for wear. The blade overlaps the shield enough for support and a certain amount of wear. The sweep shield and scraper blade extend back towards the truck and end at the extended truck centerplane when in operation. The location of the bumper clamp 10 and the angle the hinge 26 makes with the curb must be such that, when the sweep assembly is down, the outside edge of the scraper blade extends approximately one foot outside the curb side of the truck. When the assembly is raised to the travel position it must not extend beyond the frontal outline of the vehicle to be within legal height and width.

Figure 5:
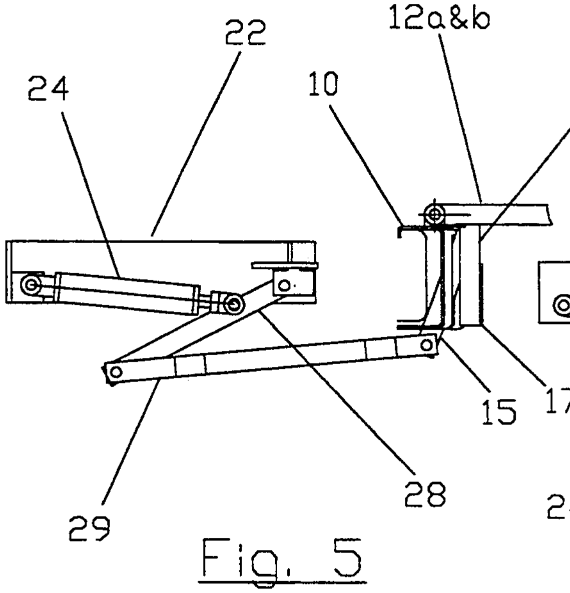
FIG. 5 shows an enlarged side view of the sweep lifting mechanism with the sweep down.
Figure 6:
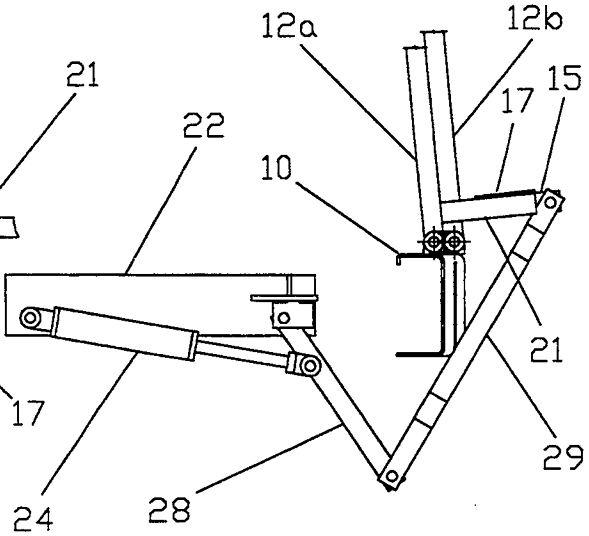
FIG. 6 is a view of FIG. 5 with the cylinder of the sweep lifting mechanism extended and the sweep up.
Figure 12:
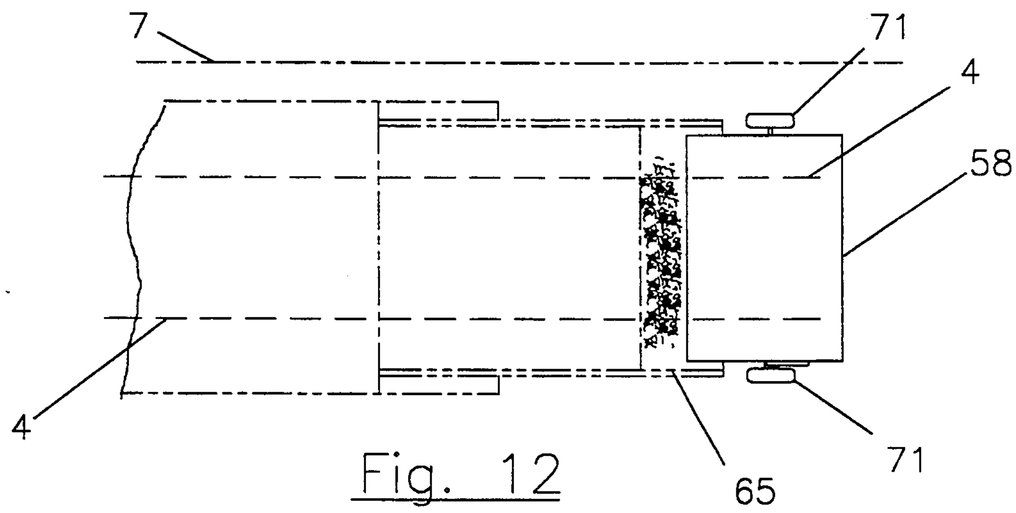
FIG. 12 is a top view of FIG. 11.
Figure 11:
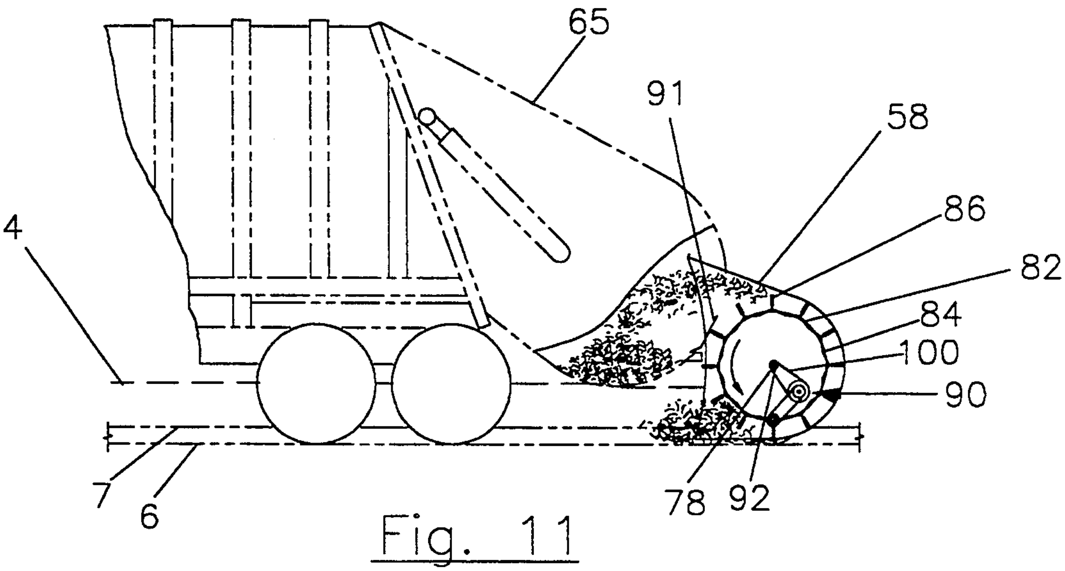
FIG. 11 is a side view of the compactor hopper area cutaway to show a drumloader in operation.

FIG. 5 and FIG. 6 show the four-bar linkage 13 for raising and lowering the sweep assembly 8. A bracket 22 is fastened to the frame member of the truck within the right wheel well. It is aligned so the hydraulic cylinder 24 and four-bar linkage operate in a plane containing a centerline between the extension arms of the sweep assembly 8. The rear swing link 28 of the four-bar linkage is pinned to the bracket 22 on the top end and supports the connecting link 29 which is pinned on the front end to the front swing link which is the lifting bar 15. The rod end of the hydraulic cylinder 24 is attached somewhat midway between the ends of the rear swing link 28. The butt end of the cylinder is pinned to a tang welded to the bracket 22.

A battery operated hydraulic power unit fitted with a solenoid operated four-way directional valve may be strategically located anywhere in the truck cab area. The solenoid operator switch is located within easy reach of the driver of the truck.

THE DETECTOR

Figure 7:
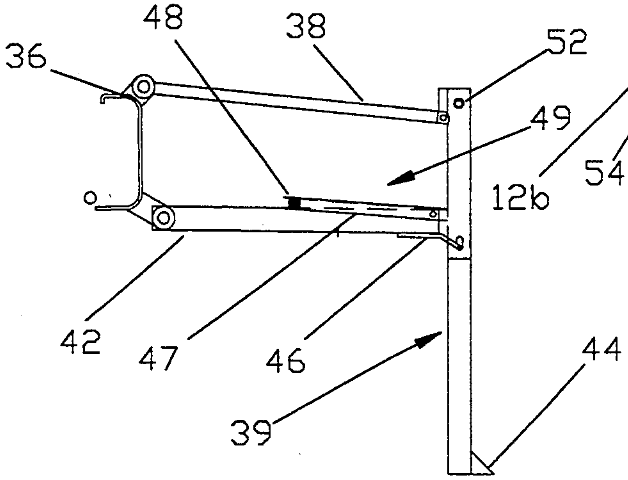
FIG. 7 is an enlarged side view of the trash detector in detecting position.
Figure 8:
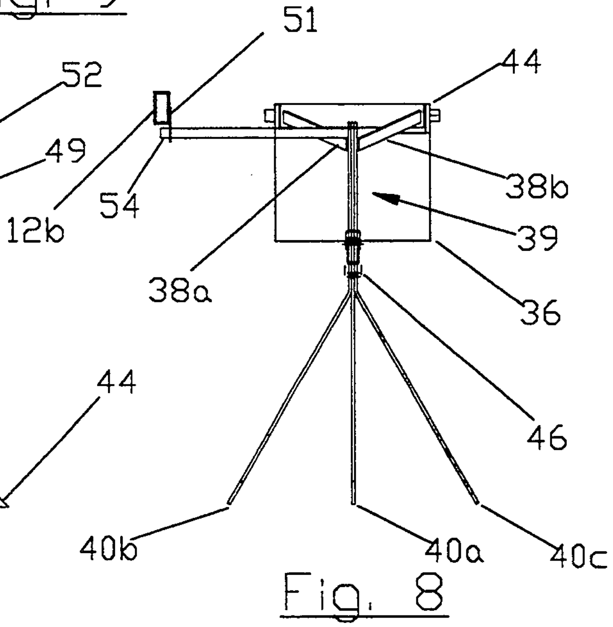
FIG. 8 shows a front view of FIG. 7.

FIG. 7 and FIG. 8 illustrate the side and front views, respectively, of the trash detector assembly 34. It is a four-bar linkage and clamps to the front bumper at the center of the truck. The detector clamp 36 is the base link and has pinned to it, the two swing links. The upper tension links 38*a* and 38*b* are spread a distance apart at the base link 36 and converge to either side of an extension block 37 welded to the top end of the connecting link assembly 39. The connecting link assembly consists of three flats approximately ⅜ inch thickness and two inches front to rear. The center flat 40*a* is straight up and down and is sandwiched between two outer flats, 40*b* and 40*c*. The latter flats diverge just below the connection to the lower swing link 42. All three flats end about two inches from the street surface and have a total spread of approximately two feet. Small triangular toes 44 are welded to the forward edge at the lower end of each of the flats. The lower swing link 42 is pinned to the detector clamp. A formed connector pin 46 is made by forming light rod to roughly a U-shape and welded to both underside corners of the lower swing link 42. Prior to welding, the connector is inserted through an ample slot in the forked connecting link assembly 39 just above the divergence of the outer flats. The lower link 42 is produced from rectangular tubing one inch by two inches and ends somewhat short of the forked link 39. A heavy gauge channel 47 envelops the top forward portion of the lower swing link. The channel is pinned to the end of the lower swing link, the forward edge of the channel pressing upon the vertical connecting link 38. A compression spring 48 is situated between the channel and lower swing link at the rear edge of the channel.

Figure 9:
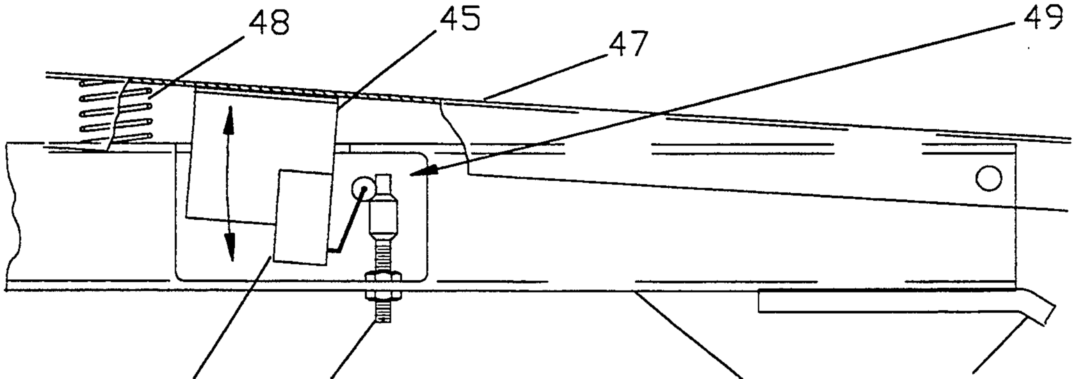
FIG. 9 is an enlarged view of the detector sound emitting device switch and activating pin.

FIG. 9 is an enlarged view of the trash warning activation assembly 49 located within the lower swing link 42. Attached to the channel 47 is an angle 45 which supports a micro switch 50 fitted with an activating arm and roller. The switch is shown in the open position. The activating pin 52 is fixed to the lower swing arm wall, vertically adjustable. The switch is in series with the truck's battery and a sound emitting device placed at a strategic location on the truck.

A follower rod 54 is attached rigidly to the top of the vertical connecting link assembly 39 extending toward and through a slot in a bracket 54 attached to the sweep arm **12*a***.

OPERATION OF THE SWEEP AND DETECTOR

The driver of the truck searches the city streets for leaves which the home occupants are asked to rake into the street gutters. Approaching a row of leaves the driver lowers the sweep arm assembly 8 using the solenoid operating switch which directs flow to the hydraulic cylinder 24 of the sweep assembly four-bar linkage. The sweep assembly lowers into sweep position and the cylinder retracts all the way back leaving the sweep assembly in a floating mode to ride the castered wheel along the contours of the street. The sweep assembly rides completely free of contact with lifting bar 15. The scraper blade 20 is forced into contact with the curb by the driver and the street surface by gravity.

Upon completion of the sweep the driver reverses the control which starts rod extension of the cylinder. The lifting bar 15 moves forward until it contacts the lifting plate 17 of the sweep assembly. The sweep assembly rotates into travel position shown in FIGS. 3 and 4.

When fitted with drumloader or beltloader, the system would include a detector. The detector lowers along with the sweep assembly forced into position by the following rod 54. As the leaves pass by its trio of flats **40*a*, 40*b* and 40*c*, pressure is applied to the nose of the detector channel 47. This pressure tends to rotate the rear of the channel into closer proximity to the upper surface of the lower swing arm 42. The compression spring 48 resists this motion and the whole system reaches equilibrium. If a branch or other trash comes in to contact with the detector arms, a greater pressure would be the result and the channel, switch support angle 45 and microswitch 50 would lower with respect to the shoulder of the activating pin 52**, thus resulting in a closure of the switch circuit and sounding of the alarm.

The driver of the truck would be compelled to stop and investigate the reason for the sound and either remove the problem or lift the sweep and detector and move on to a 'clean' pile of leaves.

THE DRUMLOADER

Figure 10:
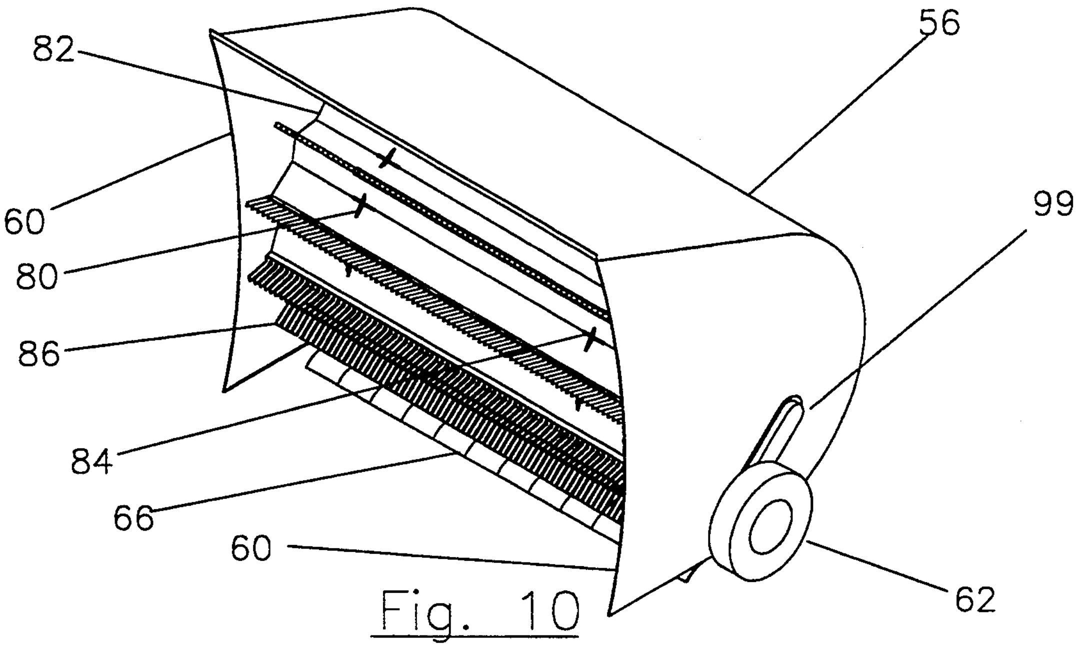
FIG. 10 is an isometric view of the drumloader.
Figure 13:
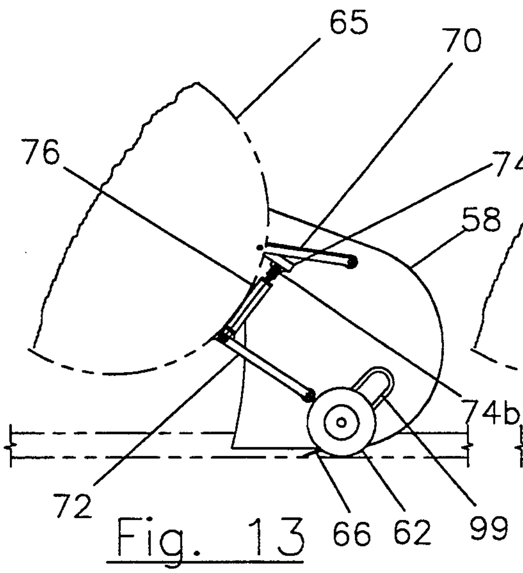
FIG. 13 is s view of the hitching mechanism for the drumloader in the travel position.
Figure 14:
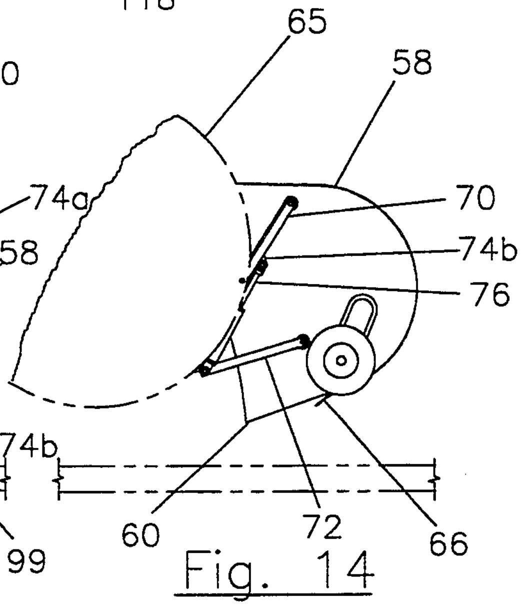
FIG. 14 is a view of the hitching mechanism of the drumloader in the loading position.

FIG. 10 is an isometric view of the drumloader. The cowling 58 is sheetmetal rolled around and welded to sideplates 60. The top edge of the cowling is flanged for support. The weight of the loader, in operation, is born by a set of wheels 62 anchored rollingly to each sideplate maintaining a three inch gap between the bottom of the cowling and the road surface. A stiffener angle 64 is welded to the bottom near the lower edge of the cowling. A series of rubber scrapers 66, made of ¼ inch thick belting strips, are riveted to a retainer strip 68 and further fastened to the underside edge of the cowling. FIG. 13 shows the drumloader held in a stable upright position and pulled along by a pair of four-bar linkages of which the two sideplates 60 are the connecting links. The upper swing arm 70 and lower swing arm 72 are connected between the sideplates and the vertical bulkheads of the compactor's hopper 65, the base link. The upper arms are fabricated by welding ⅜ thick by 2 inch flats into a channel shape. A rectangular lifting bar **74*a* is placed between the legs of the arm channel with the channel web on top. The two legs and the centered lifting bar are then pinned to the bulkhead of the hopper. A lifting bar tang 74*b* is welded to the bottom of the lifting bar for connection to the rod end of the hydraulic lift cylinder 76. The lower end of the cylinder is pinned to the hopper. The lower swing arm 72 is of rectangular mechanical tubing. FIG. 14** shows the drumloader in the travel position. Power for the lift cylinders may be derived from the compactor's hydraulic system or a hydraulic power unit which derives its power from the batteries of the truck.

Journaled to the inside walls of the sideplates 60 is the main shaft 78 of the drum assembly. Two support disks 80 of steel plate are located about 14 inches inboard from the sideplates. V-shaped strips 82 are formed to support the rakes and keep debris from the drum interior. Any number may be selected. The unit described incorporates twelve. Each strip is broken in three locations to form a shallow angle and short radial flanges on both edges running the length of the drum. The strips are slotted allowing the supporting disks to penetrate the apex of the central angle. Retaining pins 84 are inserted through holes prepared for them in the protruding portions of the disks 80 at the apex of the central angles. Multiple tined rakes 86 are formed from strips of sheetmetal the same length as the vee strips and fastened between adjacent flanges of the angled strips.

The rakes 86 are formed by punching out rectangles on one edge of a rectangular length of sheetmetal, leaving ¾ inch wide parallel tongues approximately 4 inches long and one inch on center. These tongues are deformably twisted at their roots an angle of 90 degrees forming parallel tines. Approximately an inch of material in the original strip is left intact for attachment. When attached the drum can rotate with the tips of the tines clearing the inside wall of the cowling 58 by about ½ inch. The finished drum assembly is approximately 4 feet in diameter by 6 feet in length.

A driven pulley 90 is keyed to the shaft near one end of the main shaft 78. The larger driver pulley 92 is keyed to a short jackshaft 94 penetrating an ample opening in the sideplate 60 well within the cylinder of the V-shaped strips. Support for the shaft is supplied by bearings set to a small movable idler plate 96 which covers the opening. A pair of equal sized pulleys 98 attach integrally to the wheel axle and the outer end of the jackshaft. Two v-belts 100 complete the drive train. A safety cover 99 protects the outer belt. The inside pulleys and belts must be assembled prior to attaching the v-shaped strips and rakes.

DRUMLOADER OPERATION

Dividing the drum into twelve 30 degree segments allows an approximate rake bite of 2 inches of the incoming leaves if the wheels are 16 inches in diameter and a drive train ratio of 2/1 is observed. The same bite will occur at any ground speed. The operator, who rides a platform on the curb side of the hopper, merely lowers the drumloader for loading leaves FIG. 13 and raises it for travel to the next load FIG. 14.

The design of the lifting bar 74 attached to the hydraulic lift cylinder 76 rather than to the upper swing arm 70 is an important difference. It allows the drumloader to follow the street surfaces contours without affecting the position of the cylinders ram. Otherwise, the hydraulic cylinder control valves would have to include a float section adding complexity.

THE BELTLOADER

Figure 17:
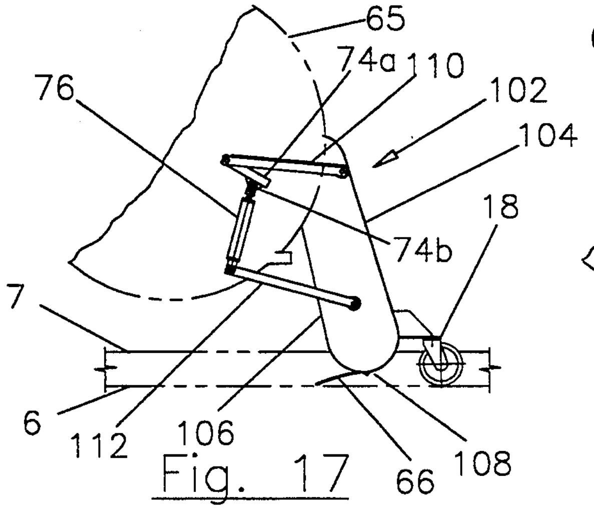
FIG. 17 is a view of the hitching mechanism for the beltloader in the travel position.
Figure 18:
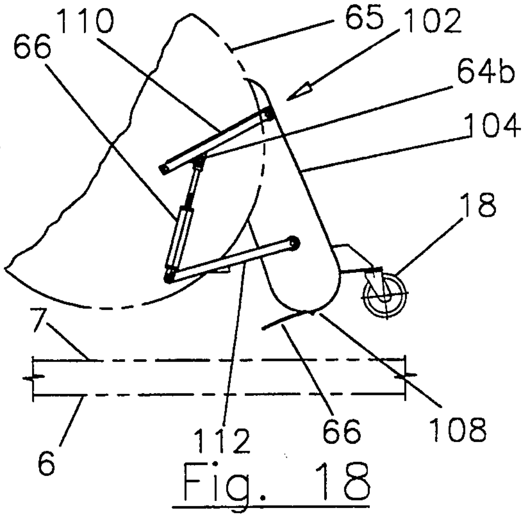
FIG. 18 is a view of the hitching mechanism of the beltloader in the loading position.
Figure 15:
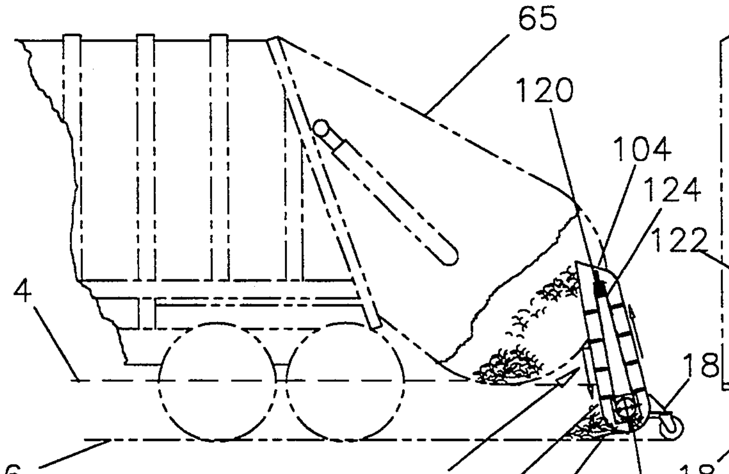
FIG. 15 is a side view of the compactor hopper area cutaway to show a beltloader in operation.
Figure 16:
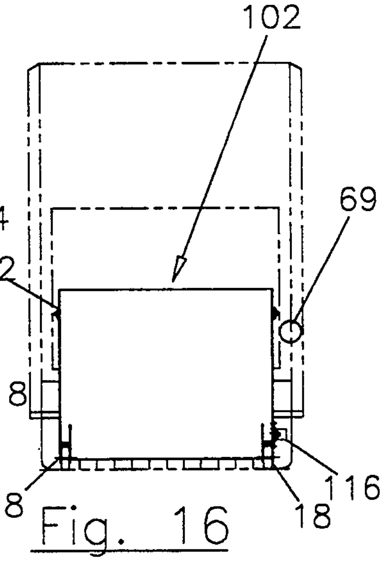
FIG. 16 is a rear view of FIG. 15.

FIG. 15 shows the hopper area cutaway to show leaves being cast into the hopper by a beltloader 102 which is shown with the left end removed. FIG. 16 is a rear view of the beltloader attached to a compactor truck. The cowling 104 is sheetmetal formed around and welded to two endplates 106 cut from steel plate. Two castered wheels 18 are fastened to brackets welded to the cowling and sideplates, maintaining approximately a three inch gap between the inside of the cowling and the road surface. An angle 108 stiffens the lower edge of the cowling. The rubber scrapers 66 are made of $\frac{1}{4}$ inch thick flat belting strips, are fastened to a retainer strip 68 and further fastened to the underside edge of the cowling. As shown in FIG. 17 and FIG. 18 the beltloader is held in a stable, nearly upright position and pulled along by two four-bar linkages 108 of which the two sideplates 106 are the connecting links. The upper swing arms 110 and lower swing arms 112 are connected to the sideplates and the vertical bulkheads of the compactor's hopper 65, the base link. The upper arms are fabricated by welding $\frac{3}{8}$ thick by 2 inch flats into a channel shape. A rectangular lifting bar **74*a* with tang 74*b* is placed between the legs of the channel with the channel web on top. The two legs and the centered lift bar share a pin at the forward end, all connected to the bulkhead of the hopper. The tang is welded to the bottom of the lifting bar for connection to the rod end of the hydraulic lift cylinder 76. The lower end of the cylinder is pinned to a tang welded to the hopper. The lower swing arm 112 is made of rectangular mechanical tubing. The hopper end of the lower swing arm rotates on the same centerline as the butt end of the cylinder 76**.

Two tubular, flat belt pulleys reside within the cowling. The lower pulley 118 is journaled to a sideplate on one end and driven, and supported, by a hydraulic motor 116 on the other end. The upper pulley 120 is journaled to belt adjusting plates 122 which in turn are fastened to the sideplates. The upper pulley supports and is driven by the rakebelt.

Figure 19:
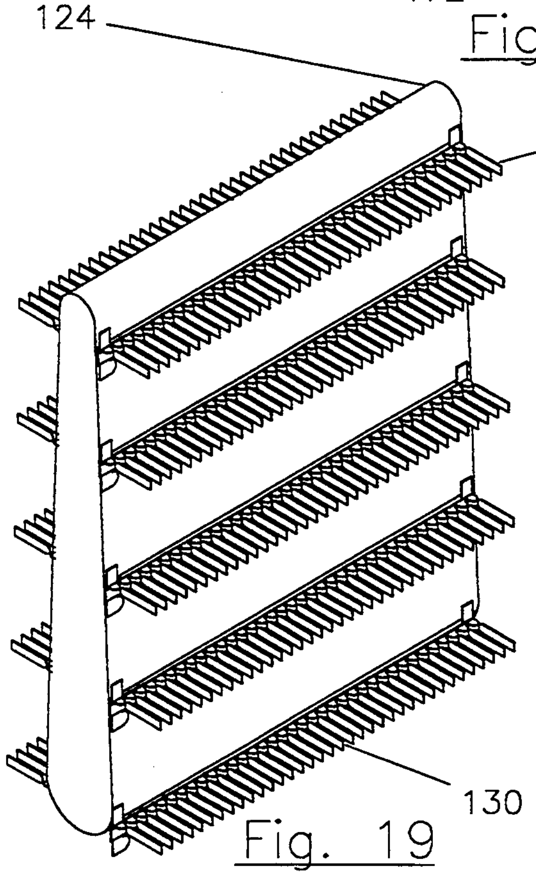
FIG. 19 is an isometric view of a rake belt with rakes attached.
Figure 20:
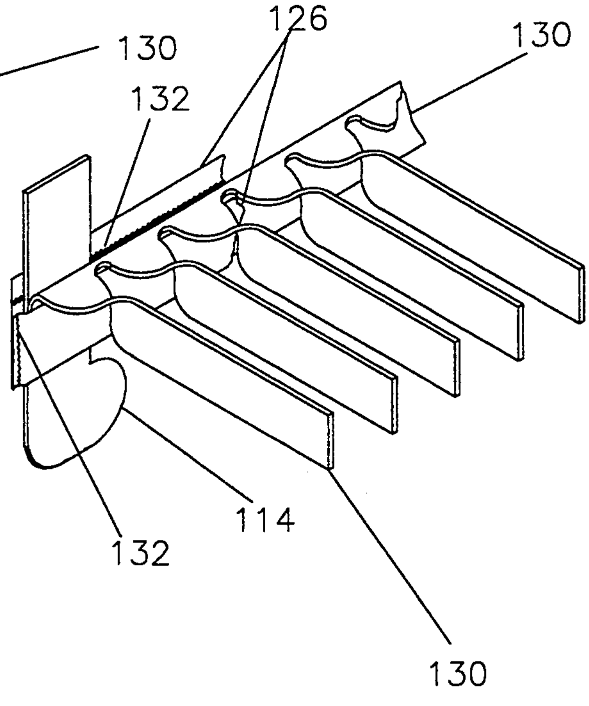
FIG. 20 is an isometric enlargement of an end portion of a typical rake and belt pocket.

The rakebelt 124 is sewn of a reinforced vinyl material commonly used by the trucking industry for tarpaulins. FIG. 19 is an isometric view of the rakebelt, including the rakes but without the pulleys. FIG. 20 is an isometric blowup of a portion of a single rake showing a rake pocket 101 sewn to the belt. The rake 102 is constructed in the shape of an unequal angle. A rake stabilizer strip 104 is spotwelded to each end on the short leg of the angle and the whole assembly inserted into the pockets. The rounded protrusion of the stabilizers help to hold the rakes in their respective pockets. The tines of the rake are constructed from the long leg of the angle as with the drumrake.

BELTRAKE OPERATION

A hydraulic power unit fitted with a manually operated, four-way valve 69 is attached to the outside of the hopper on the curb side where the loader operator may reach it from his work station. The filler opening of the hydraulic reservoir must be located so the level of the fluid will not reach the opening when the hopper is raidsed to dump the load. The operator lowers the beltrake for loading leaves and raises it for travel to the next load. The operator must also run the compactor mechanism keeping the leaves cleaned from the hopper with the compactor's hydraulic, rotating slide door. The compactor's hydraulic system may be tapped as an alternate power source.

THE SCOOPLOADER

Figure 21:
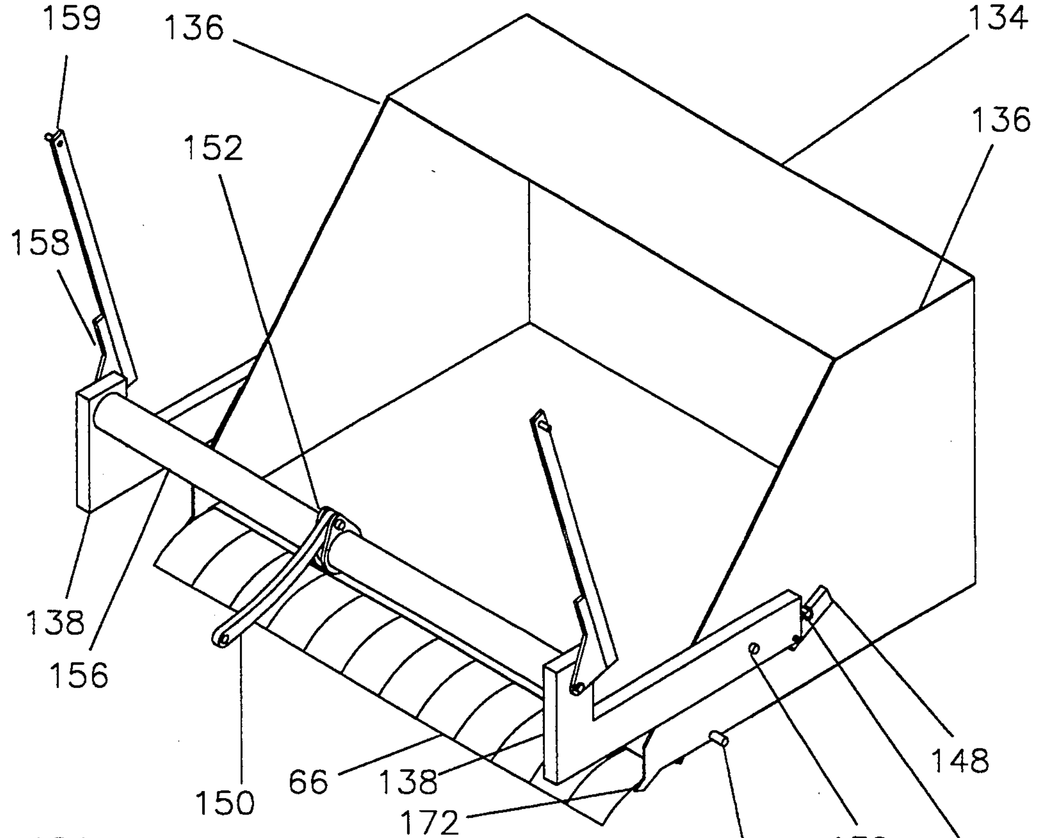
FIG. 21 is an isometric view of a scooploader.

FIG. 21 is an isometric view of the scooploader. The box is formed by breaking and welding a sheetmetal enclosure 134 to rectangular sideplates with sheared corners 136. A castered wheel 18 is fastened to a bracket welded to the cowling maintaining approximately a three inch gap between the bottom of the scooploader box and the road surface 6. An angle 72 stiffens the lower open edge of the cowling. Rubber scrapers 74 made of $\frac{1}{4}$ inch thick belting strips are fastened to a retainer strip and further fastened to the underside edge of the cowling. The front of the box is pinned to, and supported by, the two L-shaped side arms 138 fabricated of 2 inch by 6 inch tubing. Limit pins 140, one on each side of the box are placed in strategic locations to limit rotational motion of the box with respect to the arms.

The two side arms 138 are welded to both ends of a four inch torque tube 156. At the center of the tube are two ring arms 152 which form a clevis. A hydraulic cylinder linking member 150 is pinned to the clevis. The link extends forward to the clevis rod end of a single hydraulic cylinder located under the compactor's hopper 65. The hydraulic cylinder 162 is sandwiched between support plates 160 welded to the hopper's underside. The butt end of the cylinder is pinned to the support plates. The guide pin 170 connecting the link and the rod end clevis extends and runs in two slots placed in parallel with the 18 inch stroke of the rod of the cylinder. Bearing strips line the edges of the slots. The cylinder is plumbed into the same circuit as the cylinders operating the rotator door of the compactor. The directional control valve operating the compactor door is the only control.

Two swing bars 159 are welded to two stop plates 158. The plates are pinned to the outside of the side arms 138 and the swing bars are pinned to two extension plates 164 welded to the rear edge of the hopper's opening. Limiters 166 in each extension plate limits the outward rotation of the support arms.

At the end of an extended side arm of the loader is a freely swinging stop bar 148 which contains an opening slot in the side facing the end of the side arm. A stop pin 146 is fixed to the sideplate of the bax and is sized to slip into the open slot of the stop bar.

SCOOPLOADER OPERATION

Figure 26:
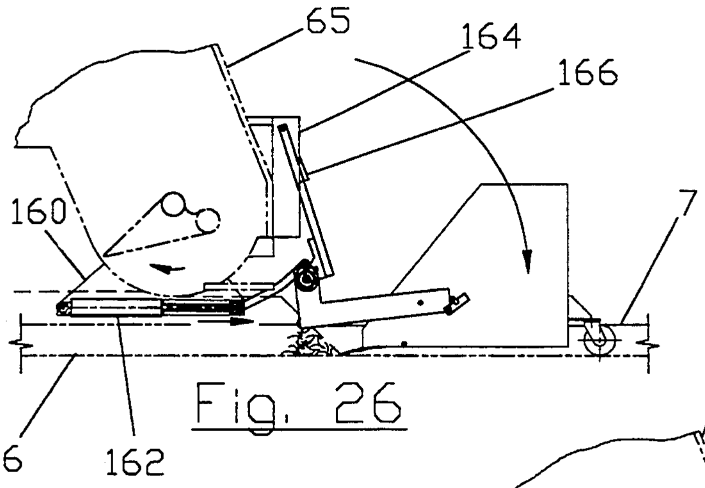
FIG. 26 is FIG. 25 with the scoop lowered to the start position, the truck starting to move and the door starting the compression stroke.
Figure 25:
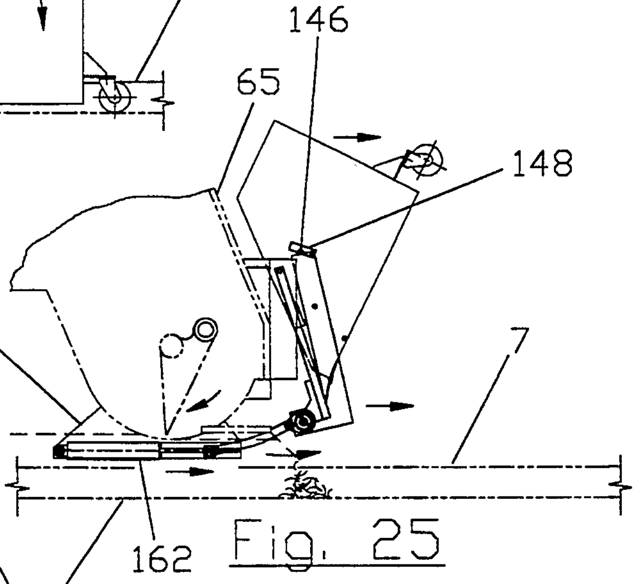
FIG. 25 is FIG. 24 with the truck stopped, the scoop backed away from the hopper ready to lower and the door down and starting the sweep stroke.
Figure 24:
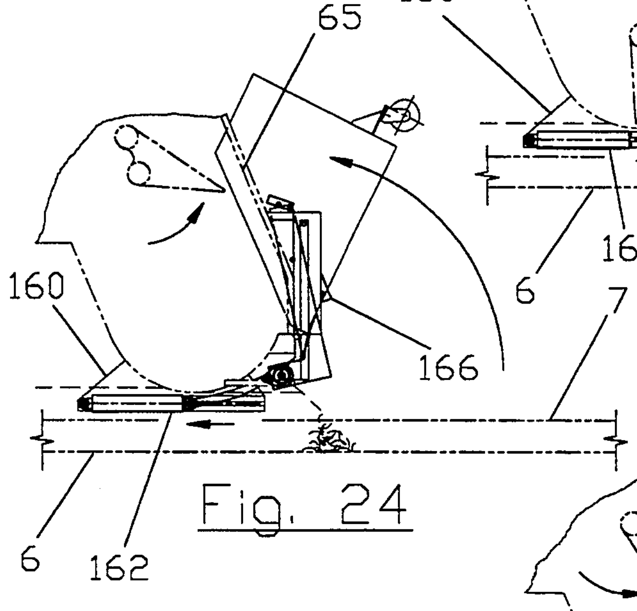
FIG. 24 is FIG. 23 with the truck stopped, the scoop dumped and the door fully revolved.
Figure 23:
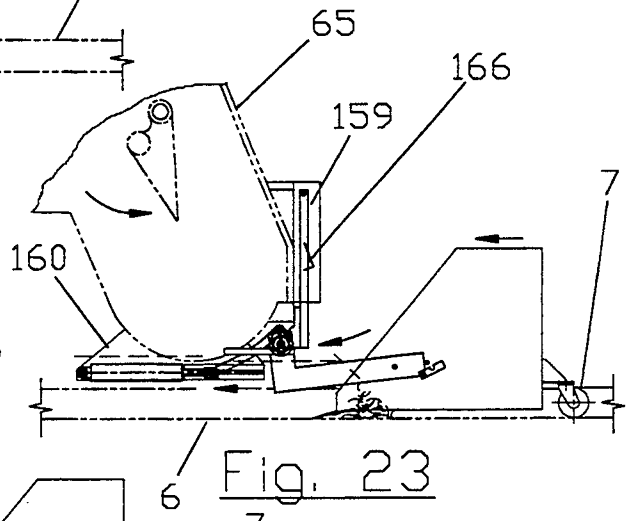
FIG. 23 is FIG. 22 with the truck stopped and the scoop pulled forward ready to start upward and the respective door position.
Figure 22:
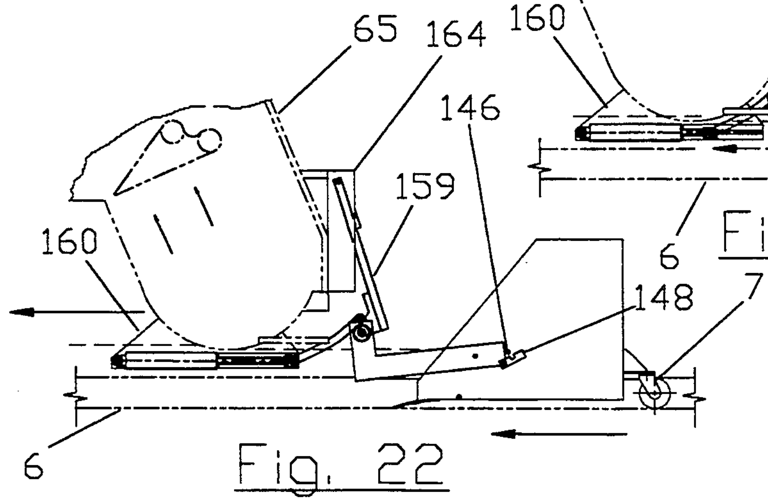
FIG. 22 is a side view of a scooploader in the loading position and the respective position of the compacting door of the hopper, truck having just stopped.

FIG. 22 shows the hydraulic cylinder fully extended placing the scoopbox at its rearmost position and the coordinated compactor door in the closed position. The loader is supported by the rear wheel 18 and the side-arm pins 139. In FIG. 23, the truck stops and the cylinder is contracted, pulling the box and arms forward. The compactor door begins opening. In FIG. 24 the cylinder fully contracts starting rotation of the torque tube and side arms. This raises the lip of the loader until the arm contacts the forward, limit pin 140. The motion continues until the load is fully dumped as shown. At the end of the dumping motion, momentum continues rotation of the box. The stop bar 148 at this time is acted upon by gravity and the open slot is eventually going to collar the stop pin 146 thus stabilizing the loader. The stop bar stays locked around the pin until the caster wheel again make contact with the street surface and gravity unlocks the stop bar from the stop pin. The door of the compactor is now completely open and the operator will open another valve which slides the door downward into position for a sweep of the newly dumped load. At the downmost point the operator starts closing the door which also starts opening the loader cylinder. FIG. 25 shows the loader backed away with the support arms rotated counter-clockwise and stopped by the extension plate limiters 166. As the cylinder continues to extend the lift arms start to rotate carrying the loader box back to the surface of the street. The castered wheel 18 make first contact taking pressure between the stop bar 148 and the stop pin 146 off allowing gravity to force the stop bar away and allowing the loader to continue back to its starting position and ending the cylinder's outward stroke. The compactor door is fully closed now and the operator rotates the lever which starts the upward slide of the door compressing the latest dumping of debris. The lip of the loader has come back down to the street surface approximately 12 inches rearward from whence it previously raised, thus assuring that it clears the slump of leaves shown in FIG. 26 which takes place as the loader is lifted.

SUMMARY, RAMIFICATIONS, AND SCOPE OF INVENTION

Accordingly, the reader will see that the leaf loading systems of this invention can be combined with the truck compactor to pickup leaves from street surfaces and efficiently transport them to a compost. The system requires but two operators and can operate with little stress on either operator. With appropriate lighting the leaf pickup compactor truck may be operated at night to allow a widening of the service area without increasing capital investment. Weather conditions which occur in the leaf seasons such as wind and rain should have little effect on the operation as the rake covers most of the opening in the hopper. The hopper opening could be shrouded during extreme weather conditions.

Taking the savings of 250,000 miles previously calculated above for the population of 100,000 and further projecting. If each truck were to burn a gallon of fuel for every 5 miles, this would save 50,000 gallons of fuel, or one half gallon per person living within the City. Projecting that to the total urban population of the State of Iowa nets a total statewide savings of nearly one million gallons of fuel per season.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

I claim:

1. A self-loading carrier of seasonally fallen leaves raked into a street comprising:

(a) a truck with a rear loading, hydraulic compactor mounted thereon, a platform attached for a person to ride while monitoring and operating said compactor and a loading means;

(b) a sweeping means clamped to a front bumper of said truck whereby a driver of said truck is capable of moving refuse from a curb under pressure of forward motion, whereupon said truck can straddle said refuse while continuing forward;

(c) controlling means for hydraulically lifting and lowering said sweeping means whereby said driver can operate said sweeping means coincident to driving said truck;

(d) said loading means located at the rear of said compactor and adjacent a rear loading hopper and in line with emerging refuse;

(e) an interface means between street surfaces and said loading means wedging refuse from said surfaces into said loading means under said pressure of said forward motion; and (f) a hitching means connecting said loading means to said hopper, said loading means pulled along on wheels rollingly attached, said hitching means including hydraulic means for raising and lowering said loading means, whereby raising allows said driver to proceed with ordinary traffic;

2. The self-loading carrier of claim 1 wherein said sweeping means comprising; a bumper clamp, a sweeping shield facing up the street and angled approximately 45 degrees to said curb, a flat sheet plastic scraper blade fastened to said shield thence to a weldment comprising; a backer frame, right and left extension arms, lift arms converging from said extension arms and ending at a lifting plate near said bumper clamp, said sweeping means simply supported in operation by a castered wheel fastened to said backer frame and a hinge welded rotatably between said bumper clamp and said extension arms, said shield curveably rolled to where, in operation, a leading edge is aimed parallel to said curb, forcing the scraper blade to assume a similar orientation, whereby said driver can vary direction slightly said scraper blade maintaining flexible contact with said curb.

3. The sell-loading carrier of claim 1 wherein the controlling means comprises a switch reachable by said driver, in series with a solenoid-operated four-way valve and an electrical supply of said truck, said valve directionally controlling a hydraulic cylinder pinned to a bracket fastened to a frame member within the right front wheelwell of said truck, said cylinder located coplanarly with the centerplane between said extension arms, said cylinder leveraged to the rear swing link of a four-bar linkage, the forward swing link being a lifting bar hinged on hinge centerline of said bumper clamp, whereby extension of a cylinder rod moves said linkage forward, said lifting bar, after some movement of said cylinder rod, making contact with said lifting plate, thence lifting said sweep mechanism into a storage position upon total extension by said rod whereby upon lowering for sweeping said lifting bar retracts completely out of contact with said lifting plate leaving said sweep mechanism to ride freely on said castered wheel and said hinge.

4. The self-loading carrier of claim 1 further containing a shielding means attached the underside of said truck whereby leaves cannot come in contact with any exhaust piping of said truck.

5. The self-loading carrier of claim 1 wherein the loading means consisting a drumloading device comprising: a sheetmetal cowling welded to sideplates forming a semi-cylindrical enclosure open forwardly and extended tangentially to a top edge, supported by said wheels and said hitching means, said interface means attached to a lower edge of said cowling, a main shaft journaled to, and within, said sideplates and supporting two integral circular disks a short distance inward from said journals, a rotary driving means located outwardly of said disks near one said journal, said driving means journally penetrating said sideplate drivingly connected said supporting wheel, said disks further supporting, drumlike, longitudinal V-shaped strips with flanges that sandwich sheetmetal rakes between adjacent said strips, said disks protruding through slots in said strips, said strips retained by pins, said rakes made of long narrow rectangles, an inner edge fastened between said flanges of said strips and an outer edge having deep, narrow, parallel quadrilaterals removed, the remaining parallel similarly shaped tongues deformably twisted 90 degrees near root ends forming tines, said tines extending nearly to said cowling, whereby movement of said truck rotates said rakes lifting said refuse up around the interior of said cowling to where said cowling opens tangentially allowing said refuse to slide radially outward from said tines with tangential velocity directed forwardly into said hopper.

6. The self-loading carrier of claim 1 wherein the loading means consisting a beltloading device comprising: a sheetmetal cowling, open forwardly, welded to a pair of sideplates, said hitching means and said wheels supporting said beltloading device with ground clearance, said interface means attached to a lower edge of said cowling, two parallel flat belt tubular pulleys journaled between said sideplates, a lower pulley coupled drivingly to a motor fixed outwardly of one said sideplate, an upper pulley located above a lower lip of said hopper and forward of said lower pulley, a supported flat belt further supporting perpendicular rakes, pockets sewn transversely of said belt, said pockets open to the direction of travel and spaced equally around said belt, said pockets acceptable of a short leg of an unequal sheetmetal angle, the angle having a crossing strip welded to said short leg on each end of said angle, an extension of said crossing strip protruding through slits in a bottom edge of said pockets, said extension broadened inward toward the center of said belt, a longer leg of said angle extending perpendicularly to said belt, an outer edge of said longer leg having deep, narrow, parallel quadrilaterals removed leaving a plurality of parallel tongues, said tongues deformably twisted at each root approximately 90 degrees forming parallel, similarly shaped rake tines, said tines extending nearly to said cowling, whereby forward movement of said truck advances said beltloading device into said refuse, each said rake in cooperation with said cowling raising a share of refuse up around said upper pulley, said refuse sliding radially off said tines with tangential velocity directed forwardly into said hopper.

7. The self-loading carrier of claim 1 wherein the loading means consisting a scooploading device comprising: a sheetmetal cowling welded to sideplates forming a box open forwardly, said sideplates having small hook extensions at lower forward corners, said interface means fastened to a lower lip of said box, a castered wheel attached to and supporting the rear end of said box with ground clearance, an arm on each side of said box, fabricated of rectangular tubing, rotatably support said open end of said box with pins fixed to said sideplates, said arms further welded to each end of a torque tube spanning the width in front of said box, a limiting pin placed near the base of each said sideplate, further support manifested by nearly vertical members pinned at an outside surface of each said arm on centerline of said torque tube and further swingingly pinned to vertical plates welded to each vertical edge of said hopper, means for limiting rotation of said vertical members being located on said vertical plates, clevis plates welded centrally to said torque tube for pinning to a linking member spanning between said torque tube and a rod end clevis of a hydraulic cylinder, said cylinder supported on both ends with pins, a butt pin extending through a set of side plates welded to a bottom surface of said hopper, a rod end clevis guide pin extending through long parallel guide slots in the side plates, said linking member attached to said rod end clevis by said guide pin, full extension of said cylinder places said box at its extreme rear position with the bottom surface of said box parallel to the mean surface of said street whereby with said forward motion of said truck said interface means wedges refuse into said box, whereby the operator determines when said box is full, signals said driver to stop said truck and starts retraction of said cylinder whereby said linking member pulls said box forward to said forward stop whereby additional contraction of said cylinder begins rotating said torque tube and said lift arms whereby the forward end of said box lifts upward to said limit pins whereby said arms lift the loaded box upward, said hook extensions of said sideplates contacts a lower lip of said hopper further rotating said box with respect to said lift arms, whereby a locking means actuates and maintains said box in a travel position said refuse having emptied into said hopper.

8. The self-loading carrier of claim 1 further including a detection means comprising: a four-bar linkage comprising; a bumper clamping base link, a wide clevis welded to an upper surface of said base link and a narrow clevis welded to a bottom surface of said base link, an upper swing link being two flats hinged at said wide clevis and pinned to a narrow block attached to a top surface of a forked connecting link, said forked link consisting of a plurality of steel flats welded together to form a rectangular cross-section at a top end and spread out to form a fork arrangement near said street surface, wherein just above said spread of said forked link is a loose connection means between said forked link and a lower swing link which is connected to said base link at said narrow clevis, a sheetmetal channel saddles over a forward end of a rectangular tube body of said lower link, said channel and said lower link pinned together at an upper foremost corner of said lower link, a foremost edge of said channel bearing against a vertical rear surface of said forked link, a compression spring between the web of said channel and the top surface of said lower link at the rear end of said channel, an angle attached to said web of said channel just forward of said spring extending downward through and opening in an upper wall of said lower link, a microswitch fastened to said angle said microswitch fastened to said angle said microswitch fitted with a roller arm, said roller arm in contact with shouldered pin protruding through and attached adjustably to a bottom wall of said lower link, said microswitch connected in series with an electrical system of said truck and a sound emitting device, whereby as said sweep mechanism diverts said refuse from said curb to said centerline of said truck, said refuse is forced through said forked link whereby unacceptable bulky forms catch, build up a moment and activate said sound emitting device.

9. The self-loading carrier of claim 1 wherein the hitching means comprises parallel sets of four-bar linkages wherein said sideplates of said loaders are the connecting links, swing arms pinned rotatingly to said sideplates linking with each vertical walls of said hopper, a top swing arm constructed of flats welded together to form a channel with web on top, a rectangular lifting bar is clevised by said flats of said channel, said flats and said bar pinned at a forward end, thence to said wall, a tang is welded to the bottom surface of said bar and pinned to a rod and clevis of a hydraulic cylinder, a butt end of said cylinder pinned to said wall, a lower swing arm also pinned rotatingly to said wall whereby extension of said cylinders rotates said lifting bars upward into contact with said webs of said channels whereupon with full extension of said cylinders said loaders are lifted into travel position, whereby full contraction of said cylinders allows said loader to roll freely over the contours of said street surfaces with little contact of said lifting bars and said webs of said upper swing arms.

10. The self-loading carrier of claim 1 wherein the interface means comprising lengths of flat belting fastened to a tie strip of sheetmetal whereby a free forward end lays gravitationally pressed to said street surfaces.

11. The scooploading device of claim 7 wherein the locking means comprises a stop bar pinned within an open end of an extension to said rectangular tubing of one said lift arm, an edge slot in the edge facing the end of the lift arm extension, a catch pin fixed in said sideplate betwixt, whereby as said box is being dumped momentum rotates said catch pin into the slot of said stop bar stopping rotation, whereby, from said travel position, said operator extends said cylinder pushing the assembly rearward until said vertical supports encounter said limit means whereby continued extension of said cylinder rotates said lift arms lowering said wheel to said street surface, gravity unlocking said stop bar thence lowering said interface means into contact with said street surface behind a slump line of said refuse.

12. The scooploading device of claim 7 wherein said hydraulic cylinder is plumbed into a hydraulic system of said compactor between a directional valve and cylinders activating compressor door rotation, whereby rotationally opening the door retracts a scoop cylinder activating a dumping cycle and rotationally closing said door activates said scoop cylinder to set said box back to a starting position.

13. The detection means of claim 8 further including a follower means connecting said detection means to said sweeping means whereby all motions of said sweeping means are communicated to said detection means.

* * * * *